US008172663B2

(12) United States Patent
Olive

(10) Patent No.: US 8,172,663 B2
(45) Date of Patent: May 8, 2012

(54) MULTI-LINE GAMING MACHINE WITH SINGLE WAGER OPTION

(75) Inventor: Scott C. Olive, Balgowlah (AU)

(73) Assignee: Aristocrat Technologies Australia Pty Ltd (AU)

( * ) Notice: Subject to any disclaimer, the term of this patent is extended or adjusted under 35 U.S.C. 154(b) by 112 days.

(21) Appl. No.: 10/826,641

(22) Filed: Apr. 15, 2004

(65) Prior Publication Data

US 2005/0026676 A1 Feb. 3, 2005

(30) Foreign Application Priority Data

Apr. 15, 2003 (AU) ................................ 2003901786

(51) Int. Cl.
*A63F 13/00* (2006.01)

(52) U.S. Cl. ........................................................ 463/20

(58) Field of Classification Search .............. 463/16–22, 463/25–27; 273/143 R See application file for complete search history.

(56) References Cited

U.S. PATENT DOCUMENTS

| | | | | |
|---|---|---|---|---|
| 4,715,604 | A * | 12/1987 | Okada | 273/143 R |
| 5,050,881 | A * | 9/1991 | Nagao | 463/21 |
| 6,033,307 | A * | 3/2000 | Vancura | 463/20 |
| 6,059,289 | A * | 5/2000 | Vancura | 273/143 R |
| 6,394,902 | B1 * | 5/2002 | Glavich et al. | 463/20 |
| 6,413,161 | B1 * | 7/2002 | Baerlocher et al. | 463/20 |
| 6,413,162 | B1 * | 7/2002 | Baerlocher et al. | 463/20 |
| 6,939,223 | B1 * | 9/2005 | Jones | 463/16 |
| 2001/0016513 | A1 * | 8/2001 | Muir et al. | 463/16 |
| 2002/0077171 | A1 * | 6/2002 | Ainsworth | 463/20 |
| 2003/0064779 | A1 | 4/2003 | Suda | |
| 2003/0114215 | A1 * | 6/2003 | Adams et al. | 463/20 |
| 2004/0072607 | A1 * | 4/2004 | Thomas et al. | 463/16 |
| 2004/0106446 | A1 * | 6/2004 | Cannon et al. | 463/16 |
| 2004/0219963 | A1 * | 11/2004 | Vancura | 463/9 |

FOREIGN PATENT DOCUMENTS

| | | | | |
|---|---|---|---|---|
| AU | 771847 | | | 3/2001 |
| AU | 749 222 | B2 | | 6/2002 |
| EP | 0 984 409 | A2 | | 3/2000 |
| EP | 0 984 409 | A3 | | 3/2000 |
| GB | 2083935 | | * | 8/1981 |
| GB | 2083935 | A | * | 3/1982 |
| WO | WO 01/33478 | | | 5/2001 |

* cited by examiner

*Primary Examiner* — Peter DungBa Vo
*Assistant Examiner* — Jeffrey Wong
(74) *Attorney, Agent, or Firm* — McAndrews, Held & Malloy, Ltd.

(57) ABSTRACT

A gaming machine for playing a multi-line spinning reel game has a display and a game controller arranged to control images of symbols displayed on the display. In the game at least one random event, in particular a spin of the reels, is caused to be displayed on the display. If a winning event occurs the machine awards a prize. The player is constrained to wager a single amount on each play of the game and may not vary the amount. This single wager amount provides eligibility to play all available lines of the game and eligibility to bonus features. No choice of other wagering options is provided.

16 Claims, 7 Drawing Sheets

MULTI-LINE GAMING MACHINE WITH SINGLE WAGER OPTION

FIELD OF THE INVENTION

This invention relates to a gaming machine. More particularly, the invention relates to a gaming machine and to an improvement to a game played on such a gaming machine.

CROSS-REFERENCE TO RELATED APPLICATIONS

This application is related to and claims priority under 35 USC 119 from Australian provisional application No 2003901786, entitled "Jackpot Deluxe" the entire contents of which are incorporated herein by reference.

BACKGROUND OF THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

One particular feature which has generated increased interest in gaming machines is the provision of bonus games also known as feature; games. These games are often provided as a series of "free" games which are triggered by the appearance of a particular indicia combination in the underlying game played on the gaming machine. However, for many bonus games, a player is required to make an ante-bet in order to be eligible to enter the bonus feature and this acts as a disincentive for players playing bonus games. For example Australian patent No 11194/01 entitled "Gaming machine with eligibility for participation in features" is one such game which requires a player to make an ante-bet prior to participating in a bonus game. Australian application No 65501/00 "Gaming machine with buy feature games", discloses another gaming machine game which requires feature games to be bought by the player.

The requirement for players to buy bonus games also has the disadvantage that it may make the calculation of the probabilities of winning more complicated.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF SUMMARY OF THE INVENTION

In a first broad aspect, the present invention provides a gaming machine arranged to play a game in which a player wagers a single amount which provides eligibility to all elements of the game including eligibility to bonus features without choice of any other wagering options.

Embodiments of the invention may provide a number of advantages over existing gaming machines. For example, it is not necessary to weight the jackpot of the prize for different bet sizes since all initial bets are the same. Secondly it is possible to tailor the statistics of the game to the one allowed bet rather than to a large range of bet profiles, thereby directly appealing to the target player.

More specifically, according to a second aspect of the present invention, there is provided a spinning reel type gaming machine having a display means and a game control means arranged to control images of symbols carried on reels and displayed on the display means, the gaming machine providing a plurality of pay lines, and being arranged to play a base game in which at least one random event is caused to be displayed on the display means and, if a predefined winning event occurs, the machine awards a prize, and wherein on the occurrence of a predetermined triggering event gaming machine provides at least one bonus feature, and wherein the player is constrained to wager a single amount on each play of the base game without choice of other wagering options which wager provides eligibility to all pay lines of the game and eligibility to the at least one bonus feature.

In a particular embodiment, there is provided gaming machine having a display means arranged to display a plurality of symbols in an array of n rows and m columns, where n and m are 2 or more, and a game control means arranged to control images displayed on the display means, the gaming machine being arranged to play an underlying game in which a prize is paid when a predetermined combination of symbols is displayed in a predetermined arrangement of symbol locations displayed on the display means, there being more than one arrangement of symbol locations for which a prize may be paid, and wherein the player is constrained to wager a single amount on each play of the underlying game which provides eligibility to win prizes for all arrangements of symbol locations for which a prize may be paid, as well as eligibility to any bonus features provided in the game without choice of other wagering options.

In a particularly preferred embodiment of the present invention, the gaming machine has a midtrim characterised by a single start or spin button is defined on the midtrim. No other type of start or spin button for initiating play of the underlying game may be provided.

The midtrim may also define "gamble" and "take win", "collect" "reserve" buttons or the like but no other buttons for either selecting the number of lines to be played or the amount of the wager on a game.

According to a further aspect of the invention, there is provided a game playing apparatus having a display means and being controlled by a game control means, the apparatus being arranged to play an underlying game in which a plurality of symbols is displayed on the display means in an array of n rows and m columns, where n and m are 2 or more, the game playing apparatus being arranged under the control of the game control means to play an underlying game in which a prize is won when a predetermined combination of symbols is displayed in a predetermined arrangement of symbol locations displayed on the display means, there being more than one arrangement of symbol locations for which a prize may be won, and wherein the player is constrained to wager a single amount on each play of the underlying game which provides eligibility to win prizes for all arrangements of symbol locations for which a prize may be won, as well as eligibility to any bonus features provided in the game without choice of other wagering options.

A game playing apparatus includes apparatus which is connectable to a network.

BRIEF DESCRIPTION OF THE DRAWINGS

The invention is now described by way of example with reference to the accompanying diagrammatic drawings in which.

DETAILED DESCRIPTION OF THE DRAWINGS

In the following detailed description, the methodology of the embodiments will be described and it is to be understood that it is within the capabilities of the noninventive worker in the art to introduce the methodology on any standard microprocessor based gaming machine by means of appropriate programming.

Traditional slot machines have made use of spinning reels to provide a display function with symbols carried on the reels being aligned to produce a game result which may or may not be a winning combination. Traditionally such machines paid a prize only on a centre row combination, however over the years more complex pay arrangements have developed in which winning combinations could appear on horizontal lines above and below the centre line, and also on diagonal lines in three reel machines. More recently, video displays have been used to simulate spinning reels. These machines are sometimes referred to as video reel machines. Pay lines have been devised which are not straight line arrangements of symbol locations although originally such pay line arrangements included only symbol locations that were horizontally or diagonally located adjacent each other and always included only one location in each column of the display. Even more recently machines have been devised where machines have been provided with matrices of pseudo spinning wheels such as a 3 by 3 matrix of reels where every position on the display screen is essentially independent and therefore could validly pay on vertical as well as horizontal pay lines.

With existing gaming machines having multiple pay lines available, also known as multi-line gaming machines the player purchases the option of playing for a win on lines other than the centre line. That is to say if he wagered one token the player played only for a winning combination on the centre line whereas if a number of tokens were wagered, the player may chose to wager some of those tokens on lines other than the centre line in the display.

As used herein a multiple pay line gaming machine refers to a gaming machine that makes at least two pay lines available on a play of the base or underlying game played on the machine.

Figure 1:
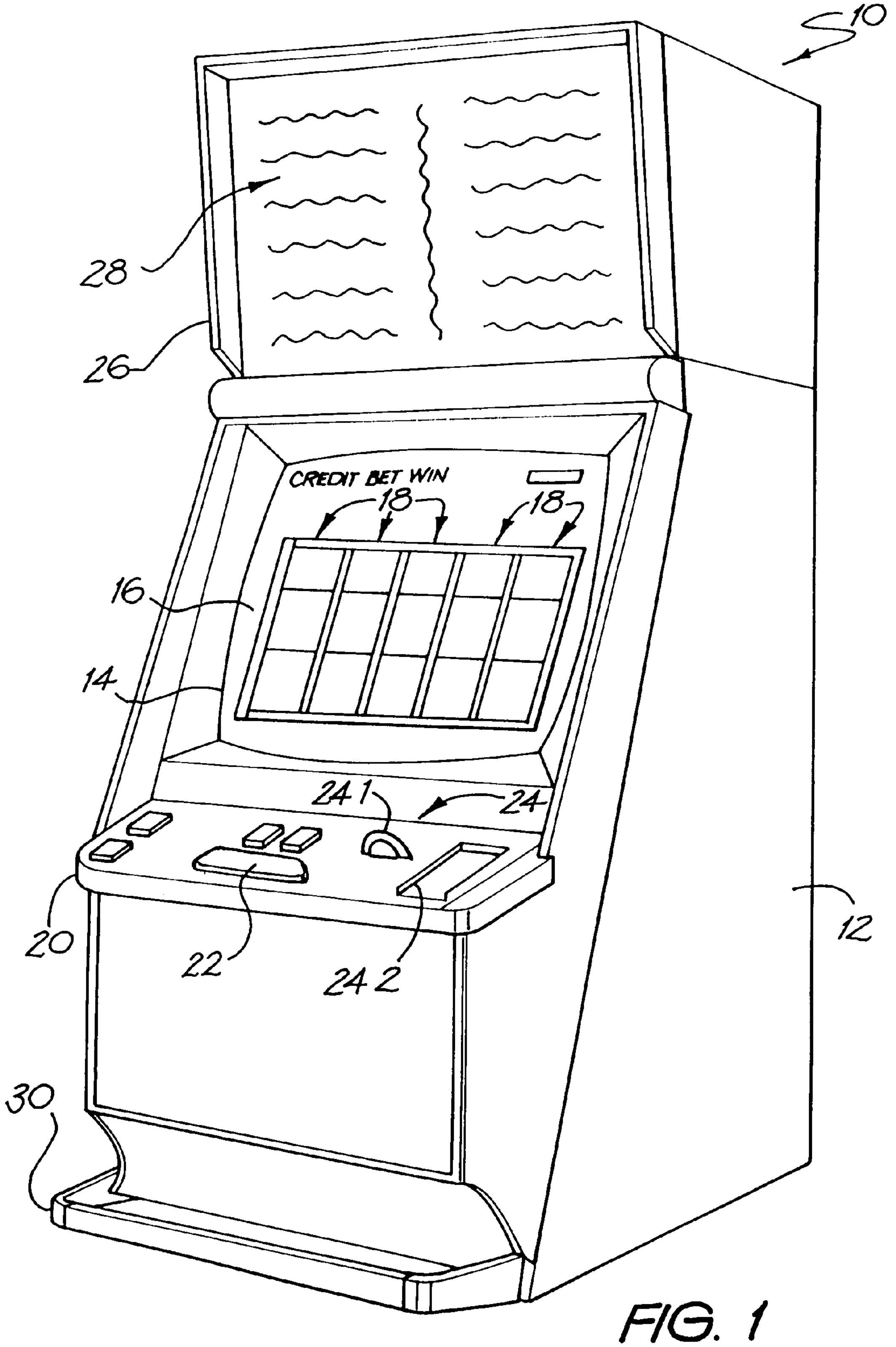
FIG. 1 shows a perspective view of a gaming machine, in accordance with the invention.

In FIG. 1, reference numeral 10 generally designates a gaming machine, including a game, in accordance with the invention. The machine 10 includes a console 12 having a display means in the form of a video display unit 14 on which a base or underlying game 16 is played, in use. The video display unit 14 may be implemented as a cathode ray screen device, a liquid crystal display, a plasma screen, or the like. The base game 16 is a spinning reel game which simulates the rotation of a number of spinning reels 18. A midtrim 20 of the machine 10 houses buttons including a start button 22 for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes pay tables, details of bonus awards, etc., described in more detail below.

A coin tray 30 is mounted beneath the console 12 for cash payouts from the machine 10.

Figure 2:
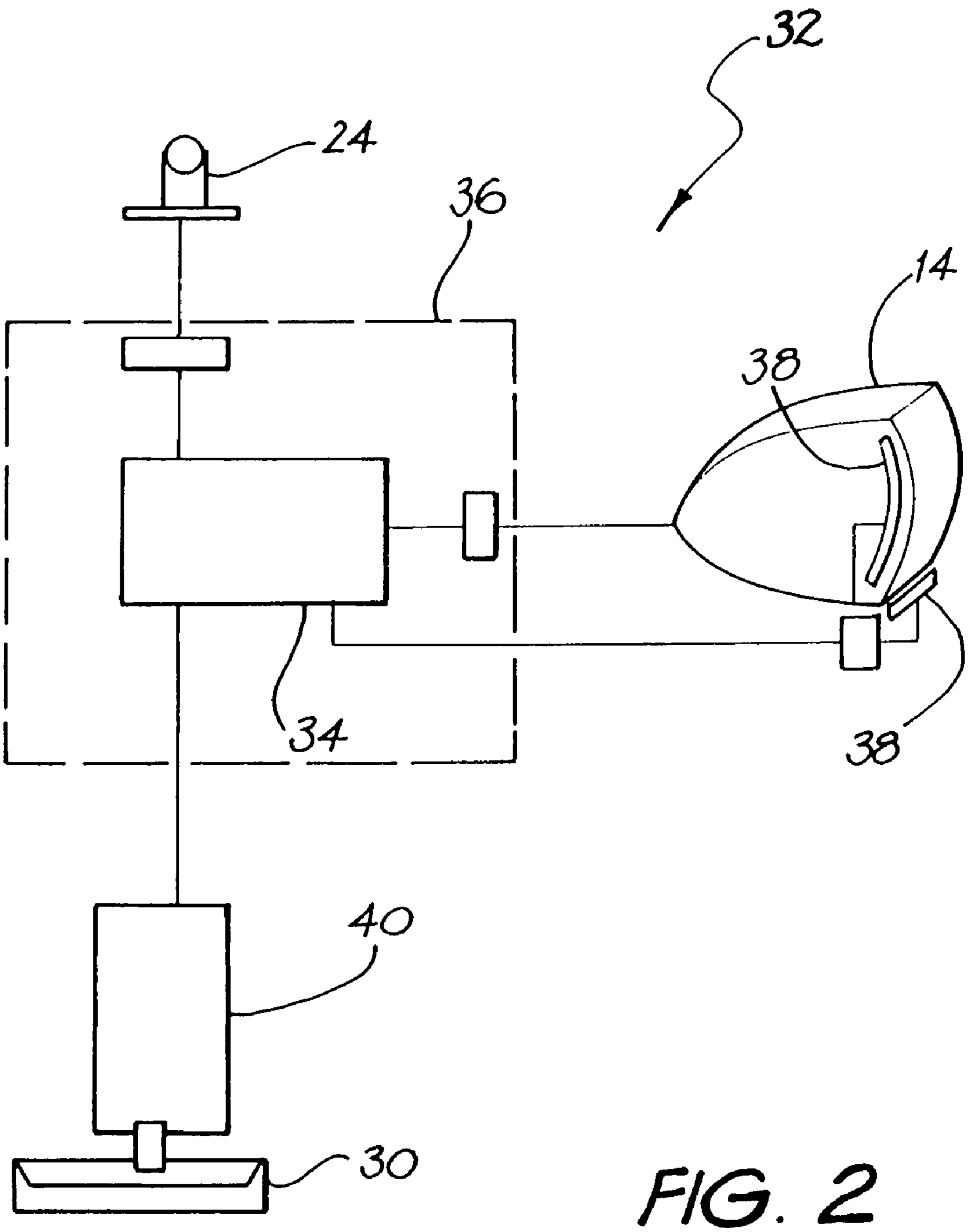
FIG. 2 shows a block diagram of a control circuit of the gaming machine.

Referring to FIG. 2 of the drawings, a control means or control circuit 32 is illustrated. A program which implements the game and user interface is run on a processor 34 of the control circuit 32. The processor 34 forms part of a controller 36 that drives the screen of the video display unit 14 and that receives input signals from sensors 38. The sensors 38 include sensors associated with the buttons and touch sensors mounted in the screen of the video display unit 14. The controller 36 also receives input pulses from the mechanism 24 to determine whether or not a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

Figure 3:
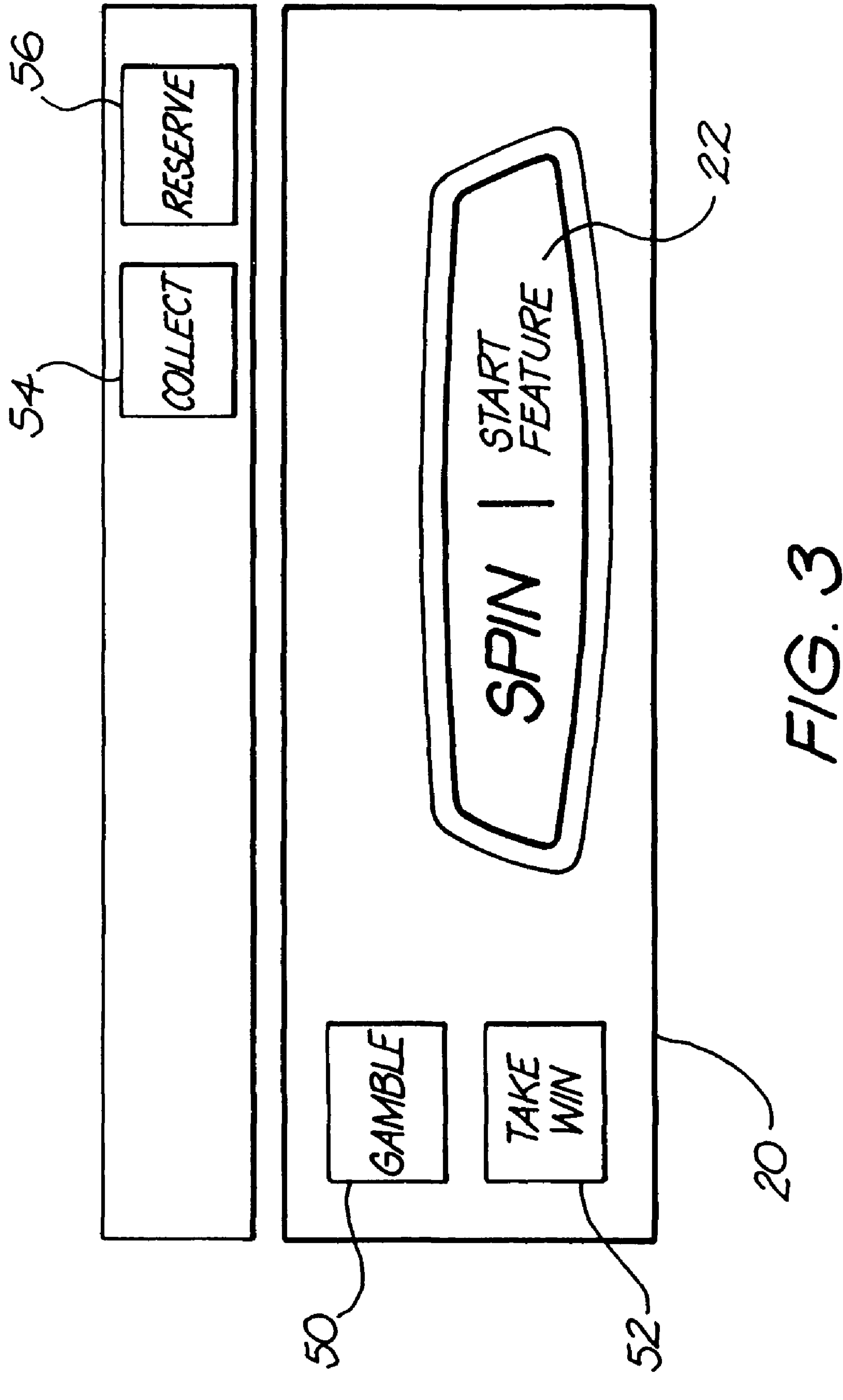
FIG. 3 shows a button panel of a midtrim of the gaming machine.

Referring to FIG. 3 and also to FIG. 1, in contrast with existing gaming machines, the midtrim 20 of the present invention does not include a bank of buttons for allowing a player to select the number of lines to be played and the bet per line. Instead, there is a single start/spin button 22 which is the only button that initiates play of the base game. (In alternative embodiments the button could be of the "touchcreen" type) There is only one betting option. In the described embodiment that one bet option, costs 100 credits and plays multiple lines, each game consisting of twenty lines. Prizes are paid as shown on the score card i.e. in contrast with existing gaming machines there is no multiplication of prizes by the bet per line. All games automatically contribute to and are eligible for the jackpot deluxe feature to be described in more detail below.

As best seen in FIG. 3, as well as defining the single spin button, the midtrim also defines "gamble" 50, "take win" 52, "collect" 54, and "reserve" 56, buttons. In playing the game, any gamble selections are made via touch screen buttons on the screen display 16 itself.

Figure 4:
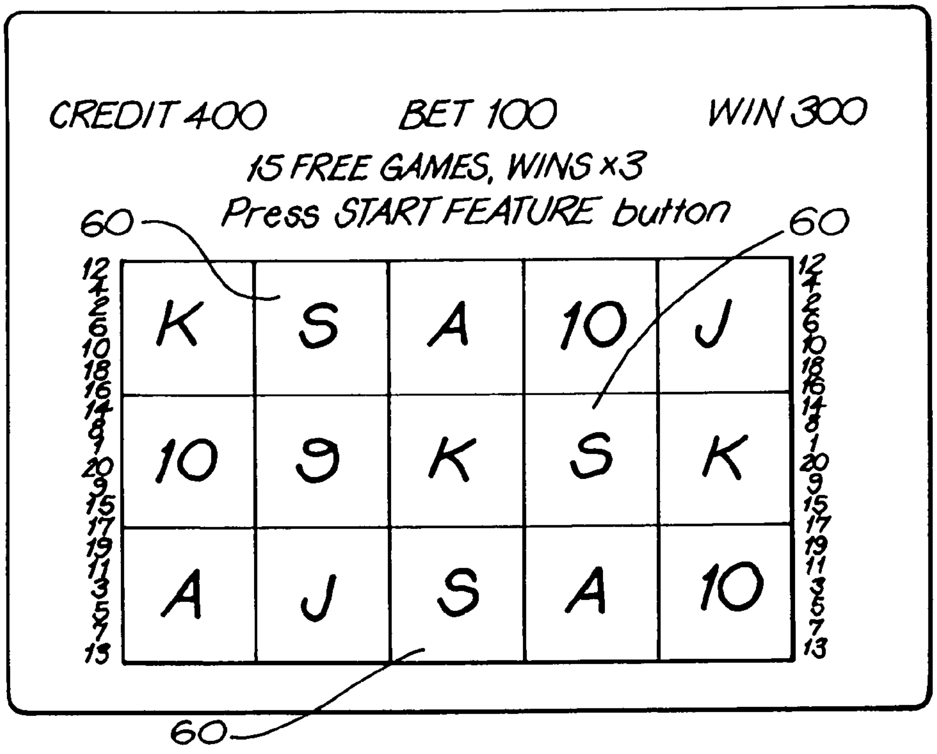
FIG. 4 shows a screen display of the gaming machine.

FIG. 4 illustrates a screen display at the start of a base or underlying game played on the gaming machine. Amongst other indicia typically displayed on virtual reels of the gaming machine display such as “9”, “10”, KING, ACE, and JACK, the screen illustrates three SCATTER symbols “S” 60. All symbols in the game pay left to right except for the SCATTER symbol “S” which pays when the SCATTER symbols appear on any line in any position. The WILD or substitute symbol “W” 62 (shown in FIG. 5) will substitute for all symbols except the SCATTER symbol and when substituting doubles the prize for the combination in which it substitutes.

In the commercial version of the game, the WILD and SCATTER symbols will relate to the theme of the underlying game. For example if the underlying game was Aristocrat’s “Queen of the Nile” game then the SCATTER symbols might be PYRAMIDs and the WILD symbols, CLEOPATRAs.

Figure 9:
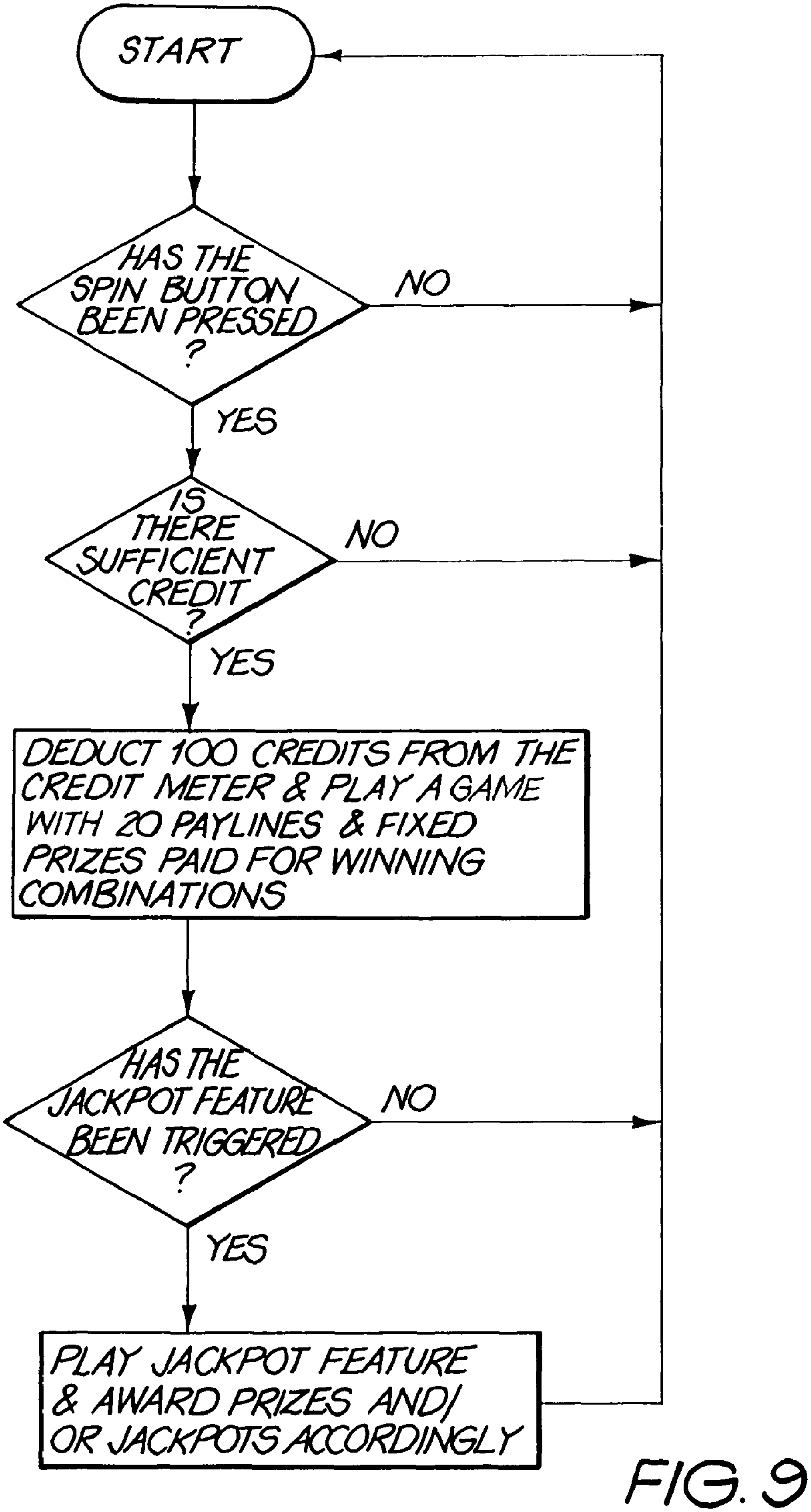
FIG. 9 shows a flow chart of the first embodiment of the game.

The bonus feature is in the form of a secondary or feature game which is triggered on a 3, 4 or 5 scatter win. As used herein the term bonus feature includes any game series such as a secondary or free game series that is distinct from the base or underlying game or eligibility for a prize or prize feature that is distinct from a standard pay table win in the base game. In the specific embodiment, the bonus features triggered are free games feature and jackpot deluxe feature. FIG. 9 is a flow chart setting out the steps in the triggering of a free game feature.

In the free games feature, fifteen free games are won. Wins for combinations of symbols in the series of free games are increased relative to wins for the corresponding combinations of symbols in the base game. In particular, all wins during the free game feature are tripled except for jackpot deluxe prizes and progressive meter amounts. If any scatter win occurs in the free game feature, a further fifteen additional free games are won. The total bet and lines played are the same as the game that started the feature.

The jackpot deluxe feature is as follows. Whenever the WILD symbol 62 appears anywhere in the window during the free game feature, all wins are first paid. The WILD symbols then flash until they are selected by the player by touching the WILD symbol on the screen. The selection can be made in any order. When the WILD symbol is touched an appropriate selection sound plays. The WILD symbol animates to reveal either a grand jackpot, major jackpot, minor jackpot, mini jackpot symbol or bonus credits of either 1000, 750, 500, 400, 300, 200 or 100 credits. The symbol revealed by the animation is determined by a probability table with each WILD symbol revealed using the same probability table.

Figure 8:
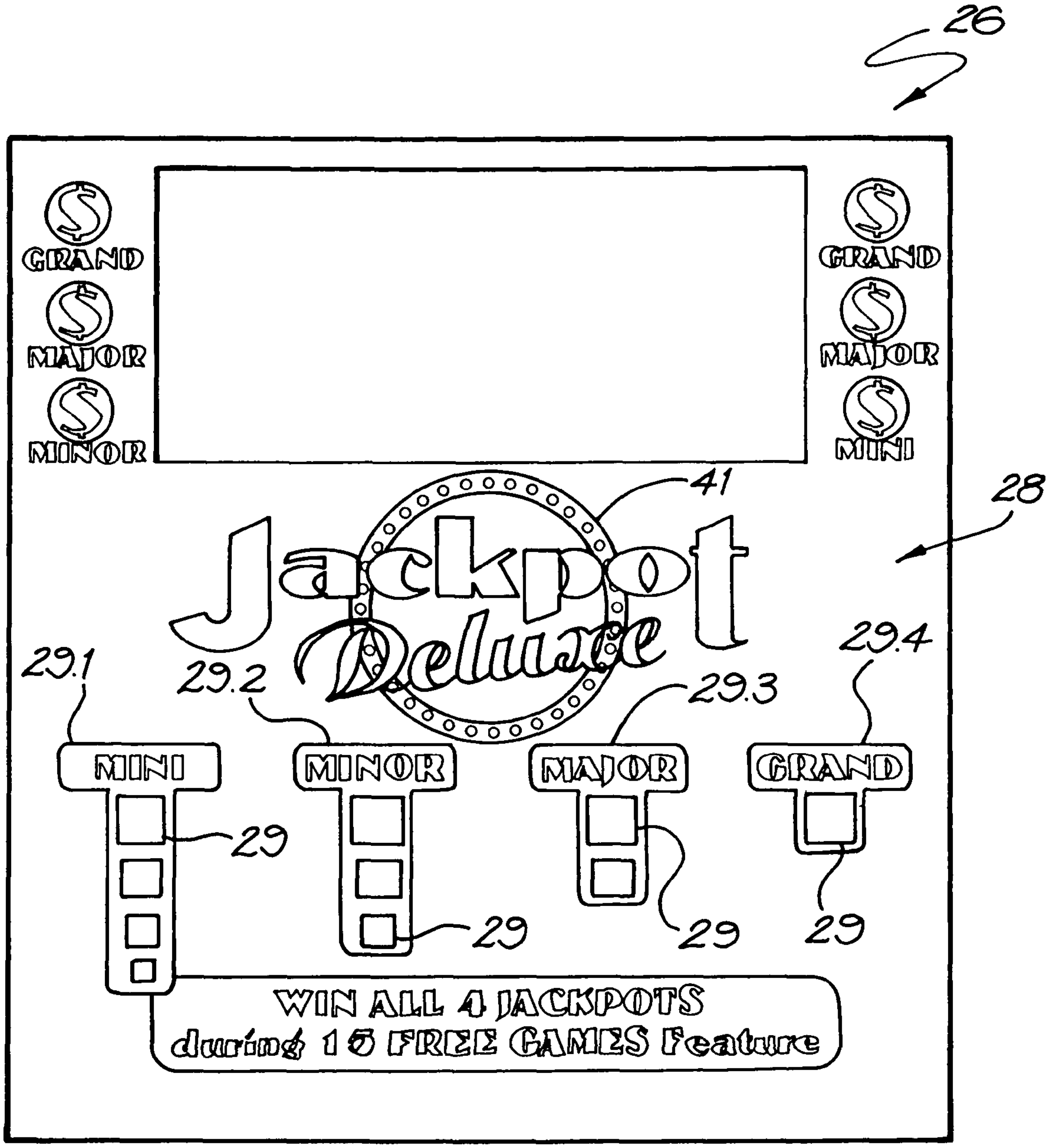
FIG. 8 illustrates a top box for the gaming machine.

For any bonus credits, wins are paid using the same methods as standard score card wins. Prizes are shown until the reel spin began. For jackpot symbols, the symbols revealed are collected and displayed on the gaming machine artwork shown in FIG. 8 and on the screen. The number of symbols required to win each jackpot is as follows.

GRAND: 1 GRAND symbols

MAJOR: 2 MAJOR symbols

MINOR: 3 MINOR symbols

MINI: 4 MINI symbols

The artwork includes a number of LEDs around the artwork to light up in the feature. Electroluminescence is used to light up jackpot symbols 29 in lines underneath headings MINI 29.1, MINOR 29.2, MAJOR 29.3 and GRAND 29.4, the number of LEDs in each line reflecting the number of symbols required to win, being one for GRAND, two for MAJOR, three for MINOR and four for MINI. Also shown is a ring of flashing lights 41 which light up when a jackpot is won.

When a jackpot is won, the jackpot symbols for that jackpot are cleared, therefore each jackpot can be won again during the free games. The jackpot symbols are cleared at the end of each feature.

During the free games, when the player is required to touch a WILD symbol, an automatic selection will occur after a ten second lapse if no selection is made. Selection is made left to right if there are multiple WILD symbols on the screen.

FIGS. 4 to 8 illustrate the playing of the game. FIG. 4 illustrates the result of playing a game of the base or underlying game on the machine which results in three SCATTER symbols appearing on the screen display. As discussed above each game of the underlying game costs 100 credits and all twenty lines are automatically played.

The SCATTER symbols trigger the fifteen free games feature and on the press of the start button 22, the free game feature commences.

Figure 5:
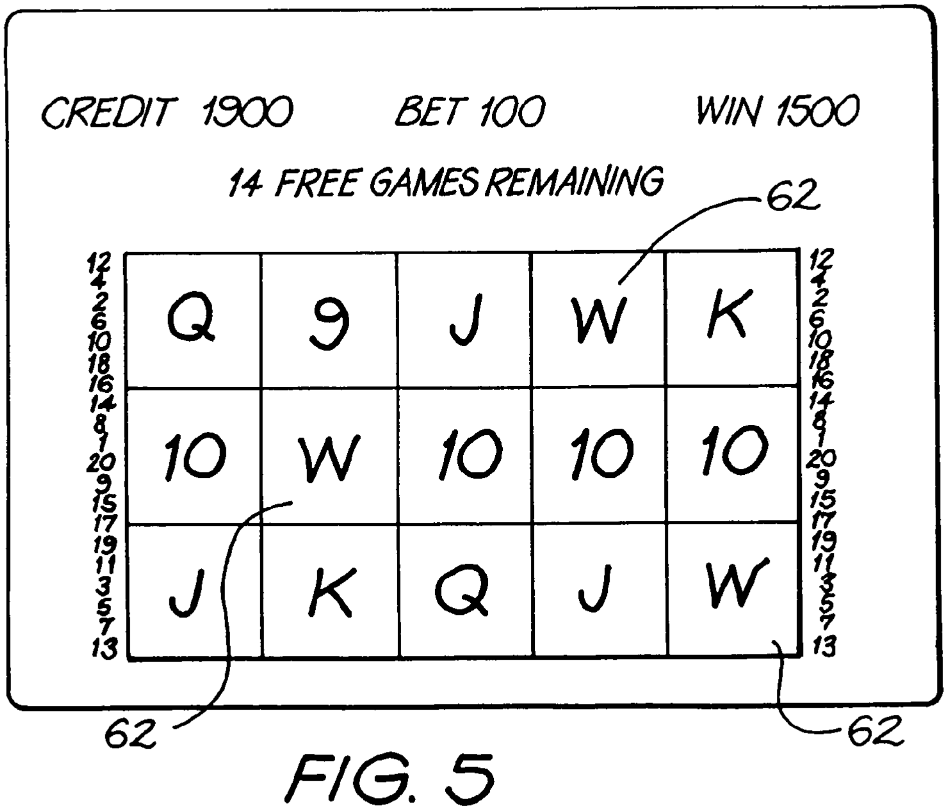
FIG. 5 shows the screen display at the end of the first feature game played.

FIG. 5 illustrates the result of the first feature game played. The win for the row of 10s is paid first, doubled due to the presence of the WILD symbol and tripled as it occurs in a free game feature. Any other wins on the other win lines are also paid at this time. After all winning lines have been first paid, the WILD symbols 62 flash until they are selected by the player.

Figure 6:
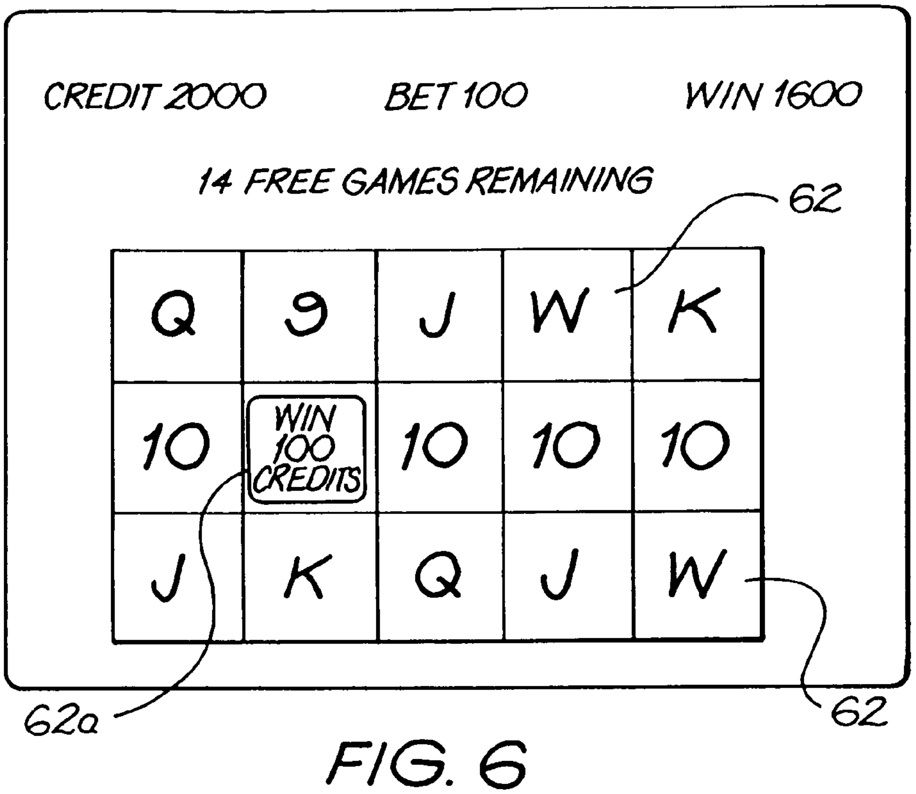
FIG. 6 shows the game after a first wild symbol prize has been revealed.

FIG. 6 illustrates the example after a first WILD symbol **62*a*** is revealed indicating that the player has won 100 credits.

Figure 7:
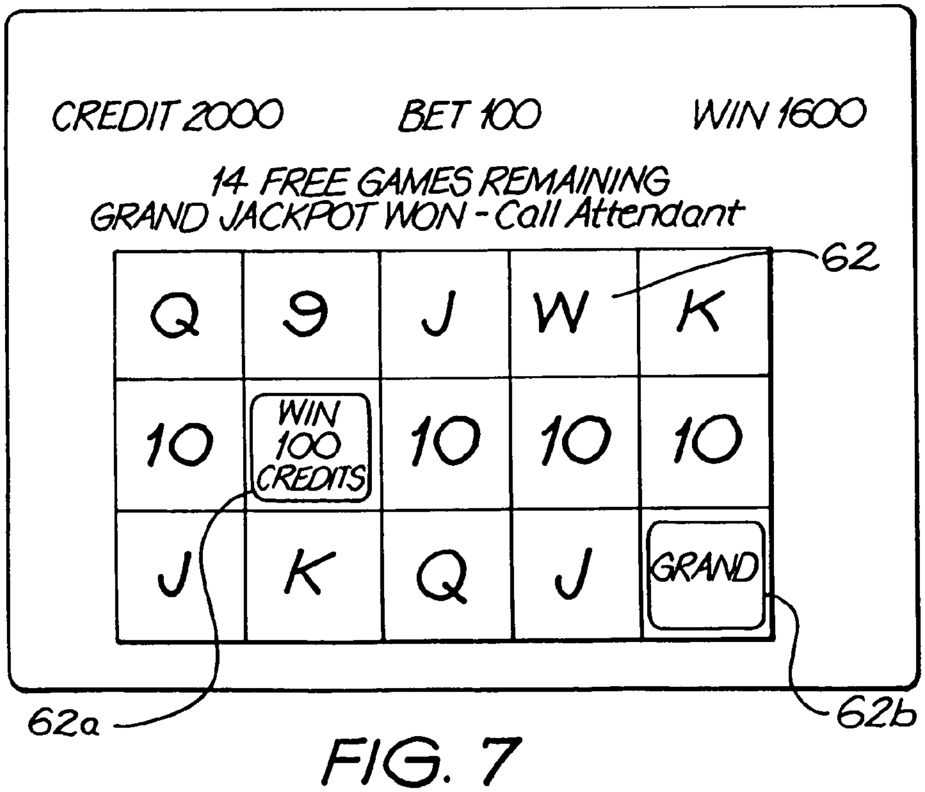
FIG. 7 shows the screen display after a second wild symbol prize has been revealed.

FIG. 7 illustrates the screen display after the player has touched a second WILD symbol **62*b*** which reveals a GRAND jackpot prize which is automatically won as only one GRAND jackpot symbol is required to win the GRAND jackpot prize.

The bonus feature may also be a progressive jackpot prize

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed as new and desired to be protected by Letters Patent of the United States is:

1. A method for use with a gaming machine that constrains wagers to a single amount on each play of a first game without a choice of other wagering options, the method comprising:

determining whether a game play button of a gaming machine has been actuated by a player;

initiating a play of the first game in response to determining that the game play button has been actuated, wherein the play of the first game comprises activating a plurality of pay lines at a cost to the player of the single amount, and wherein each pay line of the plurality of pay lines defines a symbol arrangement for determining winning combinations of symbols;

determining whether the play of the first game results in a first game award outcome, wherein the first game award outcome comprises a first predefined combination of symbols associated with at least one of the pay lines;

in response to determining that the play of the first game resulted in the first game award outcome, determining a value of a prize to be paid independently of an apportionment of the single amount associated with the at least one of the pay lines;

in response to determining that the play of the first game resulted in the first game award outcome, informing the player that they are entitled to a play of a second game;

initiating a play of the second game in response to determining that said game play button has been actuated after said step of informing;

determining whether the play of the second game results in a second game award outcome, wherein the second game award outcome comprises a second predefined combination of symbols associated with at least one of the pay lines; allowing the player to select at least one of the second predefined combination of symbols; and awarding the player only one of a plurality of prizes based on the at least one of the second predefined combination of symbols selected by the player.

2. The method as claimed in claim 1, further comprising the step of causing the gaming machine to randomly select at least one of the second predefined combination of symbols if the player does not select at least one of the second predefined combination of symbols within a period of time.

3. The method as claimed in claim 2, further comprising the step of altering the at least one of the second predefined combination of symbols selected by the player or randomly selected by the gaming machine to reveal information about the one of the plurality of prizes to be awarded to the player.

4. The method of claim 1, wherein the second game comprises a secondary game series distinct from the first game.

5. The method of claim 1, wherein the first game corresponds to a base game and the second game corresponds to a feature game distinct from the base game.

6. A gaming machine that constrains wagers to a single amount on each play of a first game without a choice of other wagering options comprising:

a game play button; and an electronic controller and a memory storage device comprising software, wherein processing of the software by the electronic controller causes the electronic controller to:

determine whether a game play button of the gaming machine has been actuated by a player;

initiate a play of the first game in response to determining that the game play button has been actuated, wherein the play of the first game comprises activating a plurality of pay lines and deducting the single amount from a player balance, and wherein each pay line of the plurality of pay lines defines a symbol arrangement for determining winning combinations of symbols;

determine whether the play of the first game results in a first game award outcome, wherein the first game award outcome comprises a first predefined combination of symbols associated with at least one of the pay lines;

in response to determining that the play of the first game resulted in the first game award outcome, determine a value of a prize to be paid independently of an apportionment of the single amount associated with the at least one of the pay lines;

in response to determining that the play of the first game resulted in the first game award outcome, inform the player that they are entitled to a play of a second game;

initiate a play of the second game in response to determining that the game play button has been actuated after said electronic controller has informed the player of entitlement to play a second game;

determine whether the play of the second game results in a second game award outcome, wherein the second game award outcome comprises a second predefined combination of symbols associated with at least one of the pay lines; allow the player to select at least one of the second predefined combination of symbols; and award the player only one of a plurality of prizes based on the at least one of the second predefined combination of symbols selected by the player.

7. The gaming machine as claimed in claim 6, wherein processing of the software by the electronic controller causes the electronic controller to:

randomly select at least one of the second predefined combination of symbols if the player does not selected at least one of the second predefined combination of symbols within a period of time.

8. The gaming machine as claimed in claim 7, wherein processing of the software by the electronic controller causes the electronic controller to:

alter the at least one of the second predefined combination of symbols selected by the player or randomly selected by the gaming machine to reveal information about the one of the plurality of prizes to be awarded to the player.

9. The gaming machine as claimed in claim 6 wherein said game play button includes visual indicia informing the player that said game play button is for (1) actuation to initiate play of a base game and (2) actuation to initiate play of a feature game.

10. The gaming machine of claim 6, wherein the first game corresponds to a base game and the second game corresponds to a feature game distinct from the base game.

11. The gaming machine of claim 6, wherein the second game comprises a secondary game series distinct from the first game.

12. A gaming machine that constrains wagers to a single amount on each play of a base game without a choice of other wagering options, the gaming machine comprising:

a button associated with a base game and a bonus feature game;

a credit input mechanism to receive credits; and a controller to initiate the base game in response to actuation of the button if sufficient credits remain to cover the single amount, initiate the bonus feature game in response to actuation of the button if an award outcome of the base game entitles play of the bonus feature game, present a plurality of symbols associated with a plurality of pay lines in response to initiating the bonus game feature, wherein each pay line of the plurality of pay lines defines a symbol arrangement for determining winning combinations of symbols, determine whether one of the selected combinations of symbols is a winning combination, allow a player to select a symbol of the winning combination; and award the player based on the selected symbol.

13. The gaming machine as claimed in claim 12, comprising a video display to display the button, and a touch sensor to sense actuation of the button.

14. The gaming machine as claimed in claim 13, wherein the base game comprises a spinning reel game having a plurality of reels and a plurality of pay lines, the single amount activates the plurality of pay lines, and the video display is to display the plurality of reels.

15. The gaming machine as claimed in claim 12, wherein the controller is to select at least one of the symbols if the selection is not received within a predetermined period of time.

16. The gaming machine as claimed in claim 15, wherein the controller is to alter the selected symbol to reveal information about the prize to be awarded.

* * * * *